United States Patent [19]

Kellner

[11] Patent Number: 5,017,013
[45] Date of Patent: May 21, 1991

[54] METHOD OF DETERMINING THE POSITION OF A REFERENCE POINT OF A SCANNER RELATIVE TO AN INCREMENTAL SCALE AS WELL AS A REFERENCE POINT COMMUNICATOR

[75] Inventor: Helmut Kellner, Moormerland, Fed. Rep. of Germany

[73] Assignee: E.M.S. Technik GmbH, Leer, Fed. Rep. of Germany

[21] Appl. No.: 493,936

[22] Filed: Mar. 15, 1990

[30] Foreign Application Priority Data

Mar. 25, 1989 [DE] Fed. Rep. of Germany ....... 3909856

[51] Int. Cl.⁵ .................... G01B 11/00; B23Q 17/22
[52] U.S. Cl. ........................................ 356/373; 33/707
[58] Field of Search ................... 356/373, 374, 375; 250/237 G; 33/707

[56] References Cited

U.S. PATENT DOCUMENTS

| | | | |
|---|---|---|---|
| 3,369,444 | 2/1968 | Patrignani | 356/373 |
| 3,973,119 | 8/1976 | Renes et al. | 250/237 G |
| 4,585,350 | 4/1986 | Pryor | 33/707 |

Primary Examiner—Richard A. Rosenberger
Attorney, Agent, or Firm—Collard, Roe & Galgano

[57] ABSTRACT

The position of a reference point of a scanner relative to an incremental scale with marks arranged thereon with constant spacings is roughly determined based on the marks passed along the scale multiplied by the spacing of the marks, and finely determined by interpolation between the marks. The interpolation between the marks is made by determining the projection angles between the reference point and three marks adjacently arranged on the scale, and by calculating the coordinates of the reference point according to trigonometric functions.

9 Claims, 1 Drawing Sheet

METHOD OF DETERMINING THE POSITION OF A REFERENCE POINT OF A SCANNER RELATIVE TO AN INCREMENTAL SCALE AS WELL AS A REFERENCE POINT COMMUNICATOR

BACKGROUND OF THE INVENTION

1. Field of the Invention

The invention relates to a method for the determination of the position of a reference point of a scanner relative to an incremental scale.

2. The Prior Art

Such a method serves, for example, the purpose of detecting in the controlling of automatic production machines the distance of travel between longitudinally displaceable objects. In such controls, the accuracy at which such distances of travel can be detected or acquired is of decisive importance for the manufacturing accuracy of the automatic machine.

Known methods make use of incremental scales with a mark resolution of up to about 2 um. So as to be able to exploit such predetermined resolution and, furthermore, to make an interpolation between the marks, the customarily used mark-reading scanners have to be guided with great precision. Hence for achieving a high measuring accuracy it is necessary to maintain very low manufacturing tolerances in the manufacture of such measuring systems, which is correspondingly reflected by the costs. Another drawback is that progressive wear of the guiding devices of the scanner constantly causes increasing measurement inaccuracies.

SUMMARY OF THE INVENTION

It is an object of the present invention to provide an improvement in a method of the type described above in such a way that high measuring accuracy is achievable regardless of any exact guidance of the scanner.

The above object is accomplished in accordance with the present invention by providing a method of determining the position of a reference point of a scanner relative to an incremental scale with marks having a constant spacing arranged thereon comprising passing the scanner by the marks; evaluating the marks passed by the scanner by counting the marks and by multiplying by the spacing, whereby a rough determination of the position along the scale is made; then determining the projection angles between the reference point and at least three marks adjacently arranged on the scale; and calculating the coordinates of the reference point based on trigonometric functions; whereby an interpolation between the marks is made for a fine determination of the position along the scale of the reference point.

The mode of operation of the invention is based on the following consideration: when two adjacent marks on a scale are read, the angle of projection between a reference point and said marks is dependent upon both the spacing at which the reference point is disposed above the marks, and to which extent said reference point is displaced sideways. A measure for the lateral displacement can be deduced from the angle only when the spacing of the reference point from the scale is preset and known.

When yet an additional adjacent mark is added and the additional angle of projection between the reference point and said additional mark and one of the other marks is determined, there exists for a combination of two projection angles only one single site in which the reference point can be found. The coordinates of the reference point can then be clearly determined by means of trigonometric functions. This relation is utilized by the invention and permits dispensing with a precise guidance of the scanner for maintaining a constant spacing from the scale. As regards the coordinates the method supplies both a measure in the direction of the axis of the scale and a measure indicating the spacing of the scanner from the scale.

For carrying out the calculation, the following calculation steps are suitable, such steps being expressed by the following formulas:

$$X_o = \frac{\Delta \cdot (Z1^2 - Z2^2)}{(Z1 - Z2)^2 + \Delta^2} \text{ and}$$

$$Z_o = \frac{\Delta^2 \cdot (Z1 + Z2)}{(Z1 - Z2)^2 + \Delta^2}, \text{ where}$$

$$Z1 = \frac{\Delta}{2 \tan \alpha} \text{ and } Z2 = \frac{\Delta}{2 \tan \beta}$$

The values $Z1$ and $Z2$ state the spacings of the centers of circles relative to the scale. These circles represent the local curves of equal circumferential angles as they conform to the projection angles $\alpha$ and $\beta$. With respect to the axis of the scale, the centers of the circles are in each case disposed between two adjacent marks. The reference point forms the point of intersection of the local curves.

Preferably, the projection angles are obtained by optical reproduction of the marks on a projection surface and by measuring the spacing of the projection sites.

With predetermined resolution of the measuring sensors on the projection surface, the required and desired resolution of the angle can be realized in this way by suitably selecting the spacing of the projection from the projection optics, as well as the focal length of the latter.

Furthermore, the invention relates to a reference point communicator.

Concerning such reference point communicator, it is an object of the invention to provide an improvement of such a reference point communicator of the afore-specified type in such a way that a high accuracy of measurement is achievable regardless of any exact guidance of the scanner.

This object is accomplished in accordance with the present invention by providing a reference point communicator for determining the position of a reference point of a scanner relative to an incremental scale with marks arranged thereon with a constant spacing comprising a counter connected with the scanner; a computer connected with said counter, means for controlling said computer in such a way that for the rough determination of the position along the scale in the x-direction, the marks passed by the scanner are first evaluated by being counted, and multiplied by the spacing; said scanner comprising an angle measuring device; said angle measuring device determining the projection angles between the reference point and three marks adjacently arranged on the scale; and said means for controlling the computer also controlling the computer in a way such that the computer calculates the coordinates of the reference point according to trigonometric functions; and whereby an interpolation between the marks is made for a fine determination.

With the reference point communicator according to the invention, at least two projection angles are determined. These angles result from between the reference point and at least three adjacent marks on the scale. Two projection angles clearly define the position of the reference point with respect to its spacing from the scale and its lateral displacement from the marks relative to the direction of the axis of the scale.

The coordinates can be purposefully determined by means of trigonometric functions, thus without having to use approximate calculations. It is particularly advantageous that this permits exact interpolations within a wide range of values that allow a signification reduction in the density of the marks on the incremental scale. In addition, this permits reducing the manufacturing cost of the latter as compared to the known systems.

A computer for the determination of the coordinates of the reference point is usefully controlled in such a way that the following formulas are applied in the calculation steps to be carried out:

$$X_o = \frac{\Delta \cdot (Z1^2 - Z2^2)}{(Z1 - Z2)^2 + \Delta^2}$$

$$Z_o = \frac{\Delta^2 \cdot (Z1 + Z2)}{(Z1 - Z2)^2 + \Delta^2} \text{ where}$$

$$Z1 = \frac{\Delta}{2 \tan \alpha} \text{ and } Z2 = \frac{\Delta}{2 \tan \beta}$$

Z1 and Z2 are the spacings between the centers of circles and the scale. The circles represent local curves of equal circumferential angles as corresponding with the projection angles $\alpha$ and $\beta$. With respect to the axis of the scale, the centers of the circles are each disposed between two adjacent marks. The reference point forms the point of intersection of the local curves.

The calculations can be made quickly and exactly with conventional computers, so that actualized values are available with practically no measurement delay even when the scanner is moving.

In a practical embodiment, the scanner is an optical scanner comprising a reproduction optics system with a projection surface and a system measuring the spacing, with the reference point being formed by the projection center of the reproduction optics.

With such a scanner, the angle resolution required for the measuring accuracy can be realized with preselected measuring sensors on the projection surface by suitably selecting the spacing of the projection surface from the projection optics and the focal length of the latter. The constructional size of optical scanners with high accuracy permits on the basis of the current state of optoelectronics such small dimensions that the scanners can be mounted in practically any location of automatic production machines that are suitable in terms of measuring practice.

Preferably, the projection surface and the system for measuring the spacing are formed by a diode array, for example a CCD line connected to a counting circuit.

Such components are available at favorable cost due to their wide application in many technical fields, and they have been perfected in the meantime to a reliable level. Through continuous further development it was possible to significantly enhance the resolution, so that, for example, $10^3$ light-receiving elements (pixel) can be accommodated across a distance of a few millimeters.

In a practical embodiment, the incremental scale has marks with a spacing of approximately 1 mm.

The afore-described type of calculation of the reference point makes said spacing sufficient to obtain a resolution of the distance covered, which otherwise would be possible only with a significantly denser arrangement for the marks. This, furthermore, significantly simplifies the manufacture of the scale.

The incremental scale preferably comprises a material with a low coefficient of thermal expansion, and is preferably made of INVAR or ZERODUR.

The present invention has the further advantage that the high system accuracy achievable by the features of the invention can be maintained in this way within a relatively wide temperature range.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

In the drawing wherein similar reference characters denote similar elements throughout the several views.

DETAILED DESCRIPTION OF PREFERRED EMBODIMENT

Figure 1:
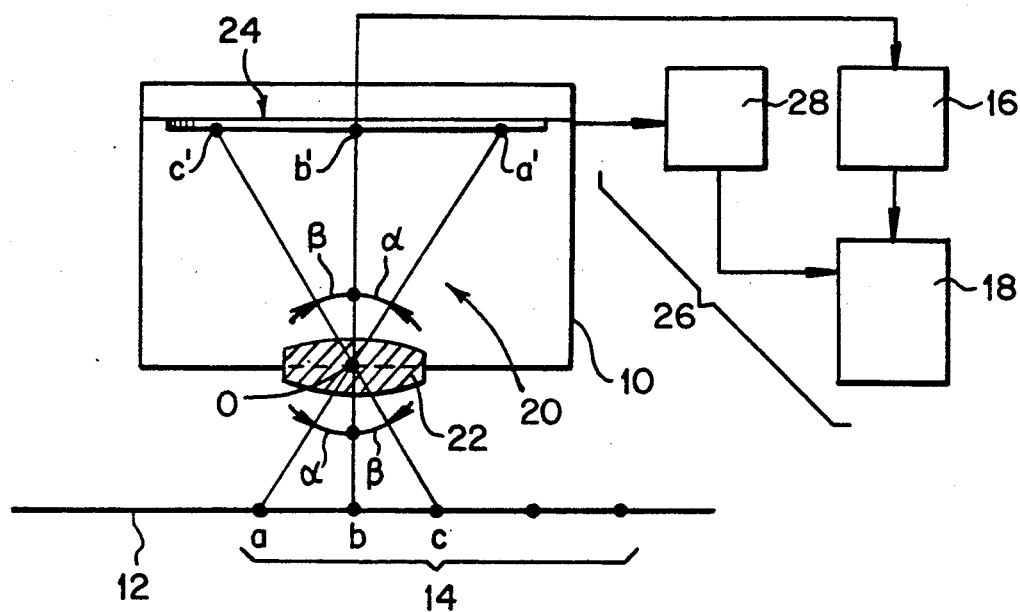
FIG. 1 shows a schematic lateral view of a reference point communicator.

FIG. 1 shows a schematic lateral view of a reference point communicator comprising an incremental scale 12 with the marks 14, of which individual marks are denoted in this case by a, b and c. A scanner 10 is disposed above the scale 12, with the scanner registering events such as the passing of the marks 14, on the one hand, and also comprising an angle measuring device 20. With the help of this angle measuring device 20 it is possible to determine projection angles formed between the marks 14 and a reference point of the scanner 10.

The scanner 10 is designed as an optical scanner and comprises a reproduction optics system 22 with a projection surface 24 as well as a system 26 for measuring the spacing. With this scanner, a reference point O is formed by the projection center of the reproduction optics 22, the center facing the scale.

The projection surface 24 with the spacing-measuring system 26 are both being present as a component of the angle-measuring device 20, and are formed by a diode array, for example in the form of a CCD-line. The number of pixels has been selected in such a way that a sufficient number of intermediate stages is detectable between the reproduction of two marks.

A counter 16 connected to a computer 18, as well as an additional counter 28 connected to the computer 18 as well, serves for evaluating the values read by the scanner 10. Thus the counter 16 serves for counting the events, that is the number of marks passed when the scanner 10 is longitudinally displaced across the incremental scale 12. With the help of the counter 16 and the computer 18, it is thus possible to obtain a rough determination of the distance traversed. In the present case, the resolution with an arrangement of the marks 14 on the incremental scale with a spacing Δ of about 1 mm is only within this order of magnitude as well.

The interpolation between the marks 14 is made by means of the angle-measuring device 20. The drawing shows that in the present case, the marks a, b and c assuming, for example, the angles α and β, respectively, are reproduced with the angle α and β at points a', b' and c' of the projection surface 24.

On the projection surface, the angle of projection is determined in each instance by means of the spacing-measuring system 26 via the measurement of the spacings of projection points a', b' and c' on the projection surface 24. If the spacing-measuring system 26 is, for example, a CCD-line, changes in the charge are effected in the sites where the marks are reproduced on the line. These changes, upon serial reading, can be registered by a counter 28 and converted by a computer 18 into corresponding angle values α and β.

Figure 2:
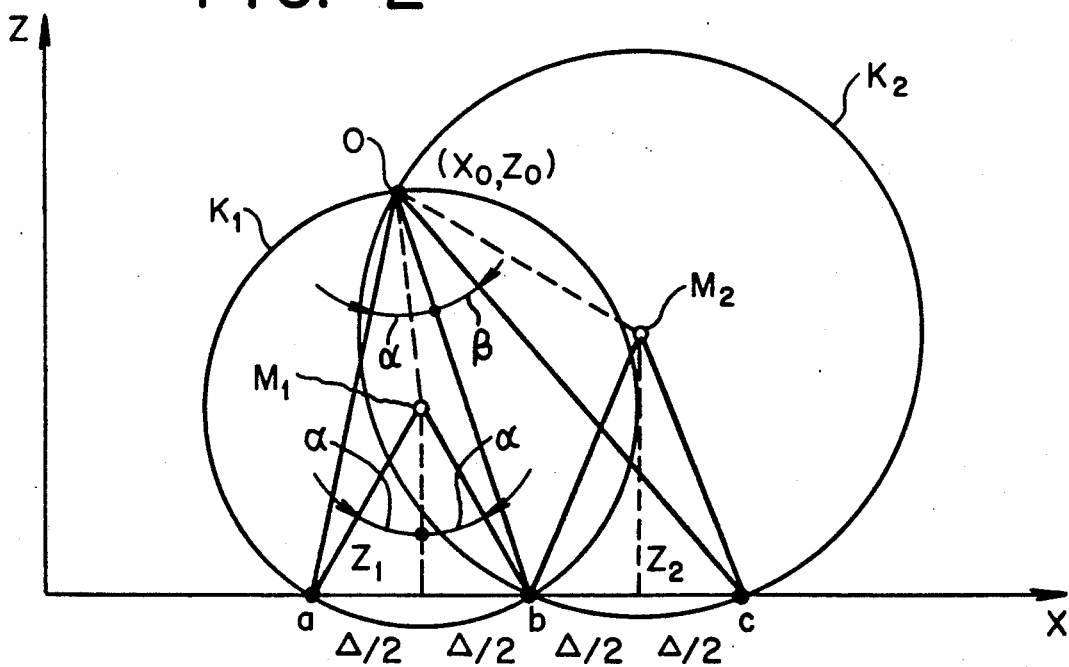
FIG. 2 is a geometric representation of the projection angles for explaining the method of calculation.

Based on the projection angles α and β, the coordinates of the reference point O, which in the present case corresponds with the projection center in the reproduction optics 22, can be determined with the application of trigonometric functions. For explaining the calculation steps, reference is made to FIG. 2, in which only the marks a, b and c and the reference point O are taken from FIG. 1. In the present example, however, the reference point O is not disposed directly above the mark b for the purpose of showing also by graphic representation that it is possible to determine any position of the reference point O.

The projection angle α is enclosed between the reference point O and the marks a and b, and the projection angle β is enclosed between the reference point O and the marks b and c. In each case, the spacings of the marks a, b and c are equal to Δ.

Now, viewing the angles α and β separately, it is obvious that there are various points assuming the same angle of projection α and β. These points are located on a local curve which, for angle α, is represented by a circle K1, and for angle β is represented by a circle K2. When one combines the two angles α and β, there is only one real point at which the condition is simultaneously satisfied. That point is given by the points of intersection of the two local curves, thus of the circles K1 and K2.

The centers M1 and M2 of the circles K1 and K2 can be determined by determining the center vertical between the marks a and b, on the one hand, and between the marks b and c on the other hand, obtaining in the present example the points of intersection with lines extending through the marks a and b, and b and c under the projection angle, thus α and β, respectively.

For the spacings of the centers M1 and M2 from the axis of the scale and thus the z-coordinate of the centers M1 and M2, the following is obtained:

$$Z1 = \frac{\Delta}{2 \tan \alpha} \text{ and } Z2 = \frac{\Delta}{2 \tan \beta}$$

Through mathematical deductions the following are obtained for $$X_o = \frac{\Delta \cdot (Z1^2 - Z2^2)}{(Z1 - Z2)^2 + \Delta^2}$$

and for

-continued
$$Z_o = \frac{\Delta^2 \cdot (Z1 + Z2)}{(Z1 - Z2)^2 + \Delta^2}$$

Thus the above equations lead to a clear solution and can be processed with conventional computers in the shortest of time.

In the above calculations one obtains both the coordinate in the X-direction and in the Z-direction, so that in the determination of the reference point O of the scanner 10, no constant spacing from scale 12 has to be maintained. Also, the orientation of the scanner 10 is free within limits, i.e., the scanner 10 may be positioned also inclined relative to the scale 12. A special advantage of the reference point communicator of the present invention is that two coordinates can be determined simultaneously, whereas according to the state of the prior art heretofore, two independent distance recorders were needed.

While only a single embodiment of the present invention has been shown and described, it is to be understood that many changes and modifications may be made thereunto without departing from the spirit and scope of the invention as defined in the appended claims.

What is claimed is:

1. A method of determining the position of a reference point of a scanner relative to an incremental scale with marks having a constant spacing arranged thereon comprising:

passing the scanner by the marks;
evaluating the marks passed by the scanner by counting the marks and by multiplying by the spacing, whereby a rough determination of the position along the scale is made;
determining the projection angles between the reference point and at least three marks adjacently arranged on the scale;
and calculating the coordinates of the reference point based on trigonometric functions;
whereby an interpolation between the marks is made for a fine determination of the position along the scale of the reference point.

2. A method as defined in claim 1, wherein the step of calculating is carried out according to the following trigonometric functions:

$$X_o = \frac{\Delta \cdot (Z1^2 - Z2^2)}{(Z1 - Z2)^2 + \Delta^2}$$

and $$Z_o = \frac{\Delta^2 \cdot (Z1 + Z2)}{(Z1 - Z2)^2 + \Delta^2}$$

where $$Z1 = \frac{\Delta}{2 \tan \alpha}$$

and $$Z2 = \frac{\Delta}{2 \tan \beta}$$

α denotes the projection angle between the reference point and a first and a second adjacent mark; β denotes the projection angle between the reference point and a second as well as a third adjacent mark; Δ is the spacing between two adjacent marks; and $X_o$ and $Z_o$ represent the coordinates of the reference point in the direction of the scale and perpendicular thereto.

3. A method as defined in claim 1, further comprising:
providing reproduction optics;

optically reproducing the marks on a projection surface;

measuring the spacing of the projection sites; and selecting the projection center of said reproduction optics as the reference point;

whereby the projection angles are obtained.

4. A reference point communicator for determining the position of a reference point of a scanner relative to an incremental scale with marks arranged thereon with a constant spacing comprising:

a counter connected with the scanner;

a computer connected with said counter, means for controlling said computer in such a way that for the rough determination of the position along the scale in the x-direction, the marks passed by the scanner are first evaluated, by being counted, and multiplied by the spacing;

said scanner comprising an angle measuring device;

said angle measuring device determining the projection angles between the reference point and three marks adjacently arranged on the scale; and means for controlling the computer in a way such that the computer calculates the coordinates of the reference point according to trigonometric functions; and whereby an interpolation between the marks is made for the fine determination of the position along the scale of the reference point.

5. A reference point communicator as defined in claim 4, wherein said computer processes the following functions or equations as the trigonometric functions:

$$X_o = \frac{\Delta \cdot (Z1^2 - Z2^2)}{(Z1 - Z2)^2 + \Delta^2}$$

and $$Z_o = \frac{\Delta^2 \cdot (Z1 + Z2)}{(Z1 - Z2)^2 + \Delta^2}$$

where $$Z1 = \frac{\Delta}{2 \tan \alpha}$$

and $$Z2 = \frac{\Delta}{2 \tan \beta}$$

$\alpha$ denotes the projection angle between the reference point and a first and a second adjacent mark; $\beta$ denotes the projection angle between the reference point and a second as well as a third adjacent mark: $\Delta$ is the spacing between two adjacent marks; and $X_o$ and $Z_o$ represent the coordinates of the reference point in the direction of the scale and perpendicular thereto.

6. A reference point communicator as defined in claim 4, wherein the scanner is an optical scanner comprising a reproduction optics with a projection surface and a spacing measuring device, whereby the reference point is formed by the projection center of the reproduction optics facing the scale.

7. A reference point communicator as defined in claim 6, wherein the projection surfaces and the spacing measuring device comprise a diode array comprising a CCD-line connected to a counting circuit.

8. A reference point communicator as defined in claim 4, wherein the incremental scale has marks having a spacing of about 1 mm.

9. A reference point communicator as defined in claim 4, wherein the incremental scale comprises a material with a low coefficient of thermal expansion.

* * * * *